(12) United States Patent
Gerdes

(10) Patent No.: US 8,892,567 B2
(45) Date of Patent: Nov. 18, 2014

(54) DISTRIBUTED SYSTEM

(75) Inventor: Christoph Gerdes, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 697 days.

(21) Appl. No.: 13/186,317

(22) Filed: Jul. 19, 2011

(65) Prior Publication Data
US 2012/0078973 A1 Mar. 29, 2012

(30) Foreign Application Priority Data

Jul. 20, 2010 (EP) .................................. 10007520

(51) Int. Cl.
*G06F 17/30* (2006.01)
(52) U.S. Cl.
CPC .............. *G06F 17/30575* (2013.01)
USPC ......................................................... 707/741
(58) Field of Classification Search
CPC ............ G06F 17/30545; G06F 1/3296; G06F 2221/2119
See application file for complete search history.

(56) References Cited

U.S. PATENT DOCUMENTS

| 7,181,578 B1 | 2/2007 | Guha et al. | |
| 7,734,714 B2 * | 6/2010 | Rogers | 709/215 |
| 7,840,353 B2 * | 11/2010 | Ouksel et al. | 701/300 |
| 2007/0013547 A1 * | 1/2007 | Boaz | 340/870.02 |
| 2008/0033943 A1 | 2/2008 | Richards et al. | |
| 2010/0036952 A1 * | 2/2010 | Hazlewood et al. | 709/226 |
| 2010/0161614 A1 | 6/2010 | Choi et al. | |
| 2012/0143873 A1 * | 6/2012 | Saadat | 707/741 |
| 2012/0197911 A1 * | 8/2012 | Banka et al. | 707/752 |

FOREIGN PATENT DOCUMENTS

| CN | 1703697 | 11/2005 |
| CN | 101697168 | 4/2010 |

OTHER PUBLICATIONS

Bahsoun, J. P. et al. "An Arbitrary Tree-Structured Replica Control Protocol", Distributed Computing Systems, 2008, ICDCS '08, The 28th International Conference on, 2008, pp. 502-511.

* cited by examiner

*Primary Examiner* — Debbie Le
(74) *Attorney, Agent, or Firm* — Cozen O'Connor

(57) ABSTRACT

A distributed system having a plurality of nodes, wherein the system comprises a set of index nodes for providing a searchable index which comprises metadata for locating data in the system, the set of index nodes is divided into read zones comprising a group of index nodes containing the complete searchable index, and the read zones are subdivided in write zones, each write zone comprising at least one index node containing a partition of said searchable index; and includes a master index node maintaining an index structure of said searchable index by collecting from each index node measures of the current read and write throughput of the respective index node dependent on a current load of the respective index node, where the master index node re-configures the read zones and the corresponding write zones in response to the measured read and write throughputs and the measured loads of the index nodes.

16 Claims, 5 Drawing Sheets

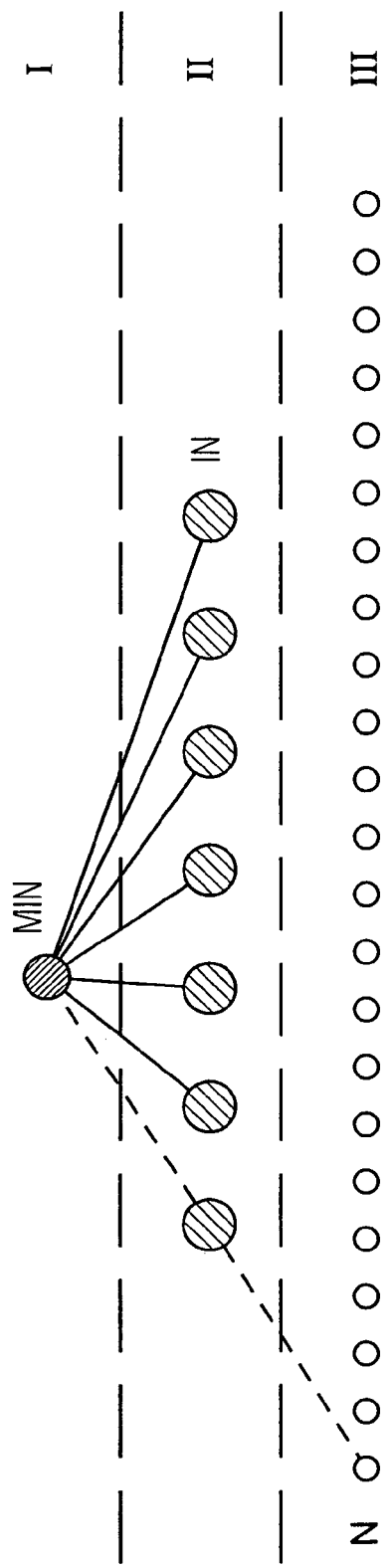

1 Read Zone =
1 Write Zone
1 RZ
1 WZ

1 Read Zone
1 Write Zones
1 RZ
3 WZ

DISTRIBUTED SYSTEM

BACKGROUND OF THE INVENTION

1. Field of the Invention

The invention relates to a distributed system comprising a plurality of nodes and, more particularly, to a large scale industrial system having an autonomous database.

2. Description of the Related Art

Industrial systems, such as power supply systems, grow constantly in size and complexity. Furthermore, modern information and communication technology allows for high frequency data sampling, e.g., by metering devices. Consequently, large amounts of data are generated by data generating nodes. Installations in a large scale industrial system are usually not homogenous but consist of a variety of hardware and software stacks each having different capabilities, strengths and weaknesses. To take full advantage of the available hardware, complex configuration is necessary. However, the size and the complexity of such large scale distributed systems demand an implementation that is capable of operating robustly with a minimum configuration and maintenance overhead.

SUMMARY OF THE INVENTION

It is an object of the present invention to provide a distributed system which operates efficiently with a minimum configuration and maintenance overhead.

This and other objects and advantages are achieved by a distributed system having a plurality of nodes, where the system includes a set of index nodes for providing a searchable index comprising metadata for locating data in the system, where the set of index nodes is divided into read zones comprising a group of index nodes containing the complete searchable index, and where the read zones are subdivided in write zones that each comprises at least one index node containing a partition of the searchable index.

The distributed system also includes a master index node that maintains an index structure of the searchable index by collecting from each index node (IN) measures of the current read-and-write throughput of a respective index node dependent on a current load of the respective index node, where the insert master index node re-configures the read zones and corresponding write zones in response to the measured read-and-write throughputs and the measured loads of the index nodes.

In an embodiment of the distributed system in accordance with the present invention, the master index node calculates an optimum number of read and write zones and re-configures the read zones and the corresponding write zones automatically such that a predetermined target read-and-write throughput is achieved.

In another embodiment, the master index node re-configures the read zones and the corresponding write zones automatically in response to the measured read-and-write throughputs and the measured write read ratios such that at least a minimum read-and-write throughput in each index node is provided.

In a further embodiment of the distributed system in accordance with the present invention, the system comprises one master index node maintaining the index structure of the searchable index, several index nodes for providing the searchable index that comprises metadata for locating data in the system, and a plurality of nodes formed by data generator nodes and data consumer nodes.

In a still further embodiment of the distributed system in accordance with the present invention, the nodes have data sources for generating data and/or data sinks for consuming data.

In a further embodiment, the data sources of the data generating nodes comprise sensors, counters and meters. In another embodiment, the nodes are connected to each other by a network to exchange data and share resources to store data. Here, the network can be a wired or a wireless network.

In a further embodiment of the distributed system in accordance with the present invention, the searchable index is provided for finding data sources and/or particular kinds of data in response to a query sent by a node to an index node.

In another embodiment, all nodes of the network comprise node identifiers, where all index nodes comprise node identifiers within a predetermined index identifier range. The node identifiers can be formed by node addresses.

In a further embodiment, the master index node comprises a memory for storing an index node table indicating a current read-and-write throughput and the current load of each index node.

In another embodiment, an index node attribute indicates whether the respective index node is a read zone master index node assigned to a read zone, a write zone master index node assigned to a write zone, a read-and-write zone master index node assigned to a read-and-write zone, or an index node not assigned to a zone.

In an embodiment, the measured load of a node comprises a current ratio between write operations and read operations performed by the respective node.

In another embodiment, the distributed system is an energy supply system comprising a plurality of metering devices as nodes for generating energy consumption data and energy supply data.

In a still further embodiment, the nodes are linked directly or indirectly by a data network to at least one index node providing the searchable index for finding data sources and/or particular kinds of data in the energy supply system.

In another embodiment, the metering devices each comprise metadata describing a characteristic of the respective metering device.

It is another object of the invention to provide a method for performing a reconfiguration of a distributed system comprising a plurality of nodes. The method comprises providing a searchable index comprising metadata for locating data in said distributed system by a set of index nodes, where the set of index nodes is divided into read zones containing the complete searchable index, and the read zones are subdivided into write zones comprising at least one index node containing a partition of said searchable index. A master index node collects, from each index node, measures of the current read-and-write throughput of the respective index node in dependence of a current load of the respective index node.

The method additionally includes re-configuring by the master index node the read zones and the corresponding write zones in response to the measured read-and-write throughputs and the measured loads of the index nodes.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following possible embodiments of the system and method according to the present invention are described with reference to the enclosed figures, in which:

FIG. 1 shows a diagram for illustrating a principle structure of the distributed system in accordance with the present invention;

DETAILED DESCRIPTION OF THE PRESENTLY PREFERRED EMBODIMENTS

Figure 2A:
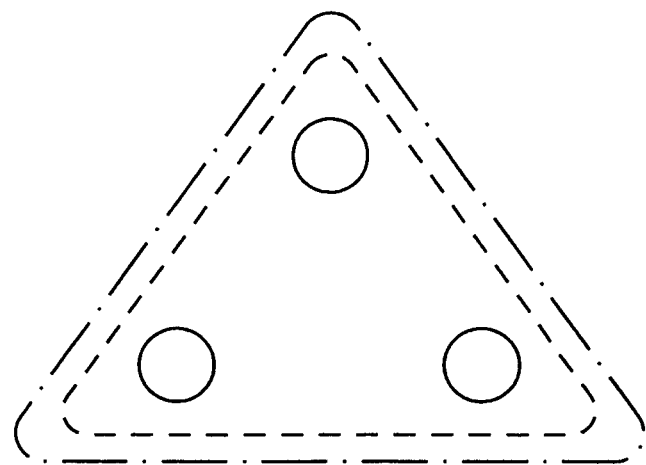
FIGS. 2a, 2b show graphical plots for illustrating a re-configuration within a distributed system in accordance with the present invention.

Industrial systems, i.e., charge scale industrial systems, can comprise a plurality of nodes. Industrial systems can comprise one or even millions of nodes generating a large amount of data.

FIG. 1 is a diagram for illustrating the structure of a distributed system in accordance an embodiment of the present invention. In the embodiment shown, the distributed system is structured in a three-level structure. At a first level I, a master index node MIN creates and maintains an index structure of a searchable index. In a second level II, index nodes IN organize different zones of nodes comprising write zones and read zones. At the third level III, the normal nodes N are provided, where these nodes comprise data generator nodes and/or data consumer nodes. The nodes N inform part of a read zone and/or a write zone.

The nodes N can have data sources for generating data and/or data sinks for consuming data. Data sources can comprise sensors, counters and meters or metering devices. For example, a data source can be a metering device of an energy supply system generating energy consumption data of a consumer consuming energy provided by a supplier over an electrical grid of a current supply system. The plurality of data generator nodes generates a high volume of real time data sets and the generated raw data is processed by data consumer nodes to derive valuable information from the data provided by the data sources, e.g., metering devices.

The nodes N of the distributed system, the index nodes IN, and the master index node MIN are connected to each other by a wired or wireless network that can comprise different topologies. The topology of the nodes can comprise a one-dimensional topology, such as a bus, a ring structure or a star structure, a two-dimensional topology, such as a tree, a grid or an array and even the three-dimensional topology, such as a hypercube.

Each node N of the network can comprise metadata describing a characteristic of the respective node. For example, a data generator node comprising a voltage sensor can comprise as node metadata that the respective node is a node which is able to measure voltages in a given range. Furthermore, the metadata of this node can indicate the location or position of the respective data generator node. This node metadata makes it possible to find nodes N fulfilling certain criteria within the distributed system.

A set of index nodes IN as shown in FIG. 1 is providing a searchable index comprising metadata for locating data stored in the distributed system. The number of index nodes IN within the distributed system is typically much lower than the number of normal nodes N in the third level III. The number of index nodes IN can be, for example, ten-index nodes IN. The master index nodes MIN maintains the index structure of the searchable index. Furthermore, additional nodes which are added to the system register with the master index node MIN. Furthermore, the master index node MIN detects failures and reconfigures the system for optimizing performance of the distributed system. In particular, the relationship between read-and-write operations has an influence on the performance. Practicating a data item stored in the system increases a read performance proportionally with the number of replicas. The trade off of replicating a data item, however, is that maintaining consistency causes write operations to become more resource demanding. Similarly, the write performance can be increased by partioning data over many nodes. A disadvantage of this in turn is that the read performance decreases because many nodes must be contacted to execute a query of a node for finding the respective data item. Furthermore, a write-read ratio of a node also has an influence on the performance of query execution. The write-read ratio is the ratio between write operations and read operations performed by the respective node N. Low write-read ratios allow for an increased throughput by caching while many write operations disable caching benefits. Using this information, the master index node MIN creates a structure model of the index cloud by collecting from each node measures of their read and write throughput in dependence on the write-read ratio, e.g., current load of the respective node.

The set of index nodes IN is divided into read zones comprising a group of index nodes containing the complete searchable index. A read zone contains the full data set currently stored in the searchable index. Read zones are further sub-divided in write zones, where each write zone contains at least one index node IN. The master index node MIN re-configures the read zones and the corresponding write zones in response to the measured read-and-write throughputs and the measured loads of the index nodes IN. The master index nodes MIN calculates an optimum number of read-and-write zones and re-configures the read zones and the corresponding write zones automatically such that a predetermined target read-and-write throughput is achieved. In an embodiment, the master index node MIN re-configures the read zones and the corresponding write zones in response to the measured read-and-write throughputs and the measured write-read ratios such that at least a minimum read-and-write throughput for each index node IN is provided. The throughput indicates the operations performed per time.

In another embodiment, the master index nodes MIN comprises a memory for storing an index node table indicating the current read-and-write throughput and the current load of each index node IN. To maintain the index structure of the searchable index, the master index nodes MIN collects from each index node IN measures of the current read-and write throughput of the respective index node in dependence of a current load, e.g., write-read ratio, of the respective index node IN. The table stored in the memory of the master index node MIN can indicate for each index node IN how many read operations and how many write operations have been performed by the respective index node IN in a predetermined time period. Based on this data, the master index node MIN calculates the optimum number of read-and-write zones and re-configures the read zones and the corresponding write zones accordingly to optimize the throughput. Each index node IN can have an attribute indicating whether the respective index node is a read zone master index node assigned to a read zone, a write zone master index assigned to a write zone, a read-and-write zone master index node assigned to a read-and-write zone or an index node not assigned to a zone.

Figure 2B:
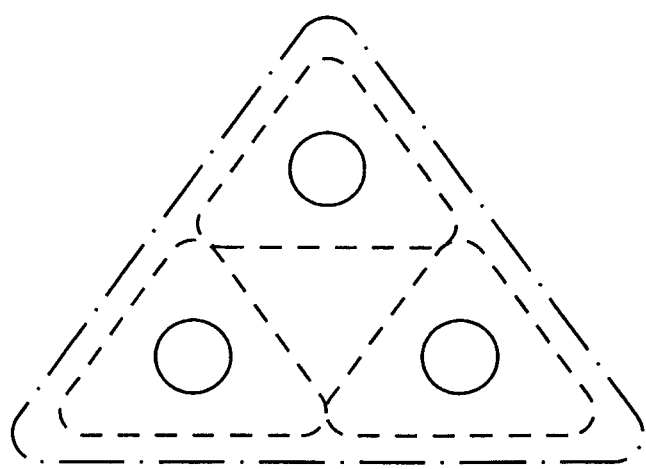

FIGS. 2a, 2b show simple diagrams for illustrating the concept of read-and-write zones. In this simple example the distributed system comprises only three nodes N.

FIGS. 2a, 2b show two extreme scenarios.

In the first scenario shown in FIG. 2a all nodes N form part of one single read zone which also forms a write zone. This read-and-write zone comprises a complete replica of the complete searchable index. The index node IN assigned to this read-and-write zone forms a read-and-write zone master index node, and contains the complete searchable index of the distributed system. Segmentation of the distributed system, as shown in FIG. 2a having a single write-and-read zone, allows for fast reading and high read performance. However, containing consistency causes write operations to become more resource demanding.

FIG. 2b illustrates the other extreme scenario. The read zone is segmented into three write zones each comprising only one single node. In this scenario, the write performance is high by partioning data over many nodes. However, the read performance is low since the many nodes must be contacted to execute a query. In the example of FIG. 2b, the searchable index is completely divided into different partitions, where each node that holds a partition of a searchable index has to be contacted in case of a query.

A query can be a message sent by a normal node N to an index node IN searching data sources within the distributed system or to find particular kinds of data stored within the distributed system. For example, a node N of an energy supplier, such as RWE, can send a query over a network to an index node IN of the distributed system to obtain information about data consumer nodes or data generator nodes within the system. The node N of the energy supplier might, for example, transmit an inquiry or a query to an index node IN to search for a metering device which is able to perform a voltage measurement within a range of 200 to 300 V and which is located in a given area, e.g., Munich. The searchable index provided by the group of index nodes IN can be used for finding these kind of data sources in response to the query sent by the node of the energy supplier. All nodes N of the network can comprise node identifiers ID, such as node addresses. In an embodiment, all index nodes IN comprise node identifiers within a predetermined index identifier range. For example, the index nodes IN can comprise node addresses in a predetermined range of the address space within the network. In a simple example, if the address space of the network comprises only 100 addresses, the range of address 80 to address 100 can be reserved for index nodes IN. In this example, an inquiring node N can send its inquiry to a node having a node identifier within the predetermined index identifier range, e.g., to a node having an address between 80 and 100, such as node address 87.

Figure 3A:
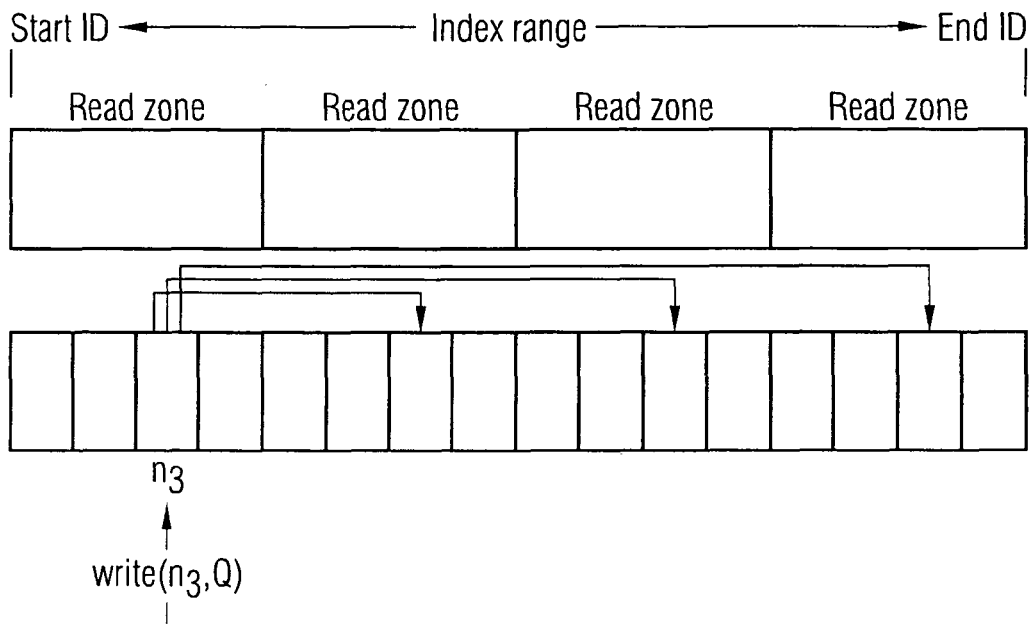
FIGS. 3a, 3b show diagrams for illustrating a segmentation into read-and-write zones within a distributed system in accordance with the present invention.
Figure 3B:
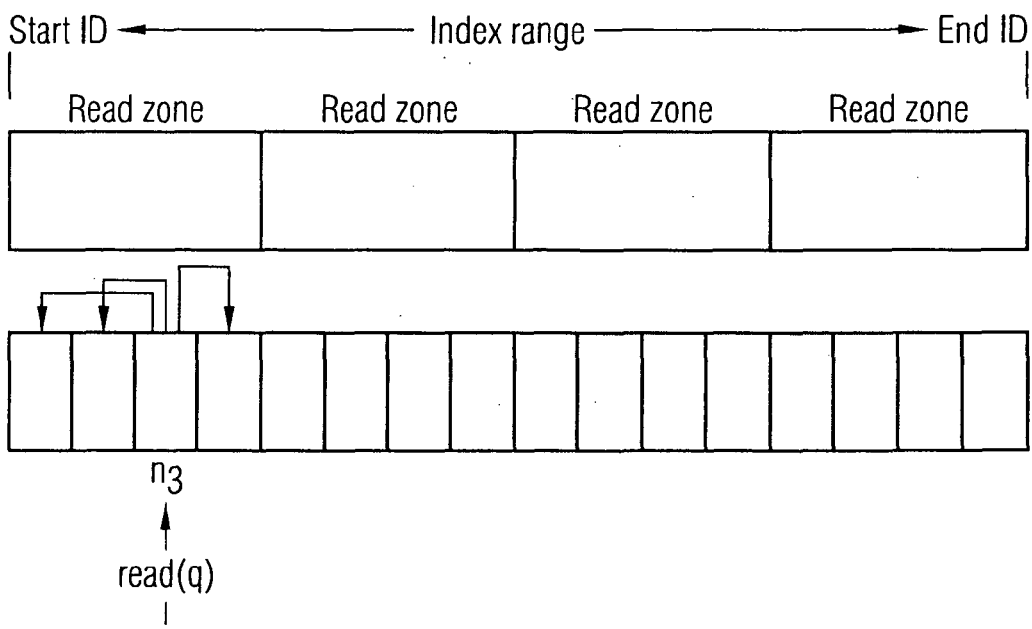

FIGS. 3a, 3b illustrate such an index range beginning with a start ID and an end ID.

As evident in FIGS. 3a, 3b, a set of index nodes is divided into read zones comprising index nodes IN containing the complete searchable index, where the read zones are subdivided into write zones. Each write zone comprises at least one index node containing a partition of the searchable index.

FIG. 3a illustrates a write operation. FIG. 3b illustrates a read operation.

Figure 4:
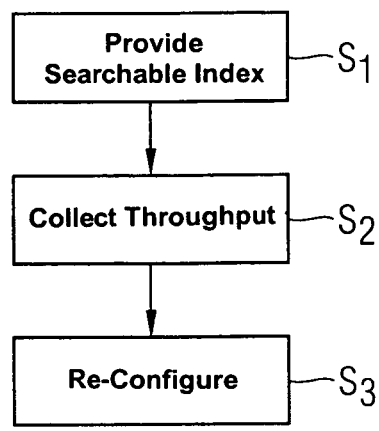
FIG. 4 is a flowchart illustrating a method for performing a re-configuration of a distributed system in accordance with an embodiment of the present invention.

FIG. 4 shows a flow chart of a method for performing a re-configuration of the distributed system in accordance with an embodiment of the present invention.

In a first step S1, a searchable index is provided comprising metadata for locating data in the distributed system. The searchable index is provided by a set of index nodes IN. The set of index nodes is divided into read zones containing the complete searchable index, where the read zones are subdivided into write zones comprising at least one index IN node containing a partition of the searchable index.

In a further step S2, the master index node MIN collects from each index node measures of the current read-and-write throughput of the respective index node IN dependent on a current load of the respective index node.

In a further step S3, the master index node MIN re-configures the read zones and the corresponding write zones in response to the measured read-and-write throughputs and the measured loads of the index nodes. The master index node MIN can calculate an optimum number of read-and-write zones and re-configure the read zones and the corresponding write zones automatically such that a predetermined target read-and-write throughput in the system is achieved.

The method in accordance with the present invention allows for a highly available data management in a distributed and heterogeneous environment. Here, the re-configuration of the read-and-write zones is performed autonomously. Consequently, an additional configuration and management effort does not occur. By sharing the resources of the data sources and consumers no additional hardware is needed. For example, given an index node with an average throughput of 1986 read and 14 write operations per second, a load with a write-read ratio of 0.007 and a total required throughput of 1600 read and 115 write operations per second, an index with six read zones and 41 write zones would meet the target requirements.

Additionally, for standard query processing the index nodes IN offer additional functionality to handle large data sets consistently. The index node structure of the distributed system has considerable influence on the system performance. The index can be optimized for read operations or write operations. If the index is optimized for read operations, then it is capable of delivering timely information for local query processing. With increasing size of the system, load patterns shift from mainly read to mostly write operations. Each index node IN can be used primarily to provide an index for node metadata. Furthermore, write operations can occur when nodes re-register due to a failure situation, such as a system failure or network interruption. Accordingly, the write loads in the system depend on the meantime to failures (MTTF) of the nodes N. The meantime to failure (MTTF) can vary depending of the respective distributed system. While (MTTF) of certain hours are common for nodes in the internet a meantime to failure (MTTF) in the range of years is more likely for devices or nodes in an industrial environment. In addition to the write operations triggered by system or network failures, soft state data items are renewed on a regular basis to prevent their deletion. In an embodiment, the system comprises monitoring to detect node failures and a mechanism to clear out data promptly.

The read load on the index cloud depends on the types of devices or nodes currently active in the distributed system. Furthermore, the read load depends on the applications using the distributed system.

The write performance in a fully or replicated index cloud is limited by the maximum number of write operations supported by the slowest index node, since eventually all updates need to be written at any index node. Depending on the configuration, additional index clouds can yield a better performance in the context of high write load requirements.

In a possible embodiment the index node IN implements a caching stream where query results are cached by the query and invalidated once an item matching the query is written. Read-and-write performance of the partitioned index cloud can be controlled by increasing or decreasing write or read zones. Thus, the method in accordance with the invention provides an optimal configuration for a given operation load, i.e., read-write ratio.

Figure 5:
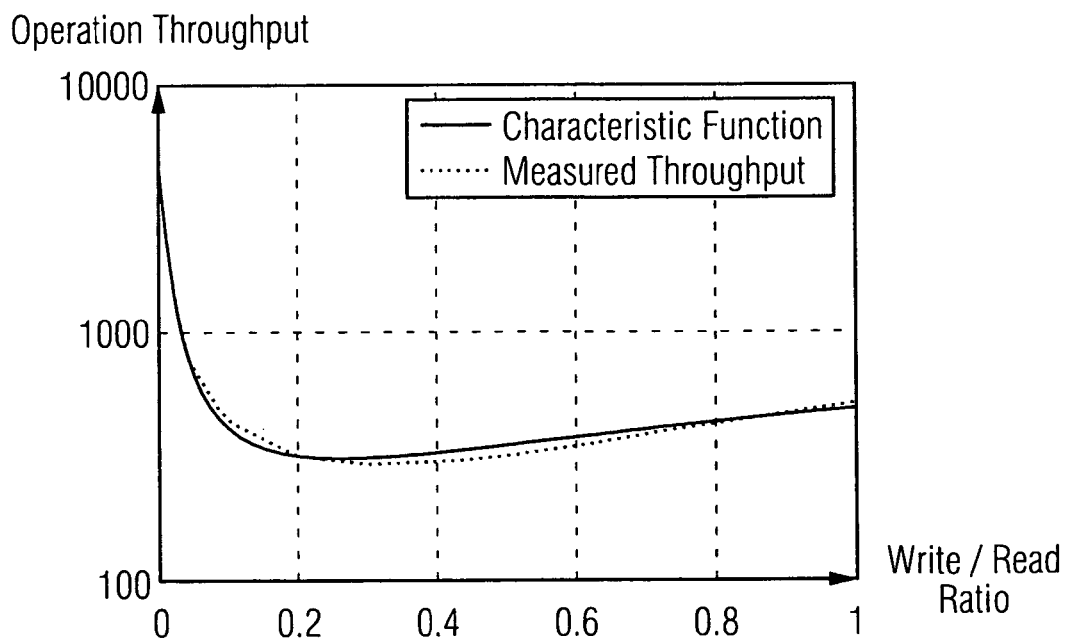
FIGS. 5 and 6 show graphical plots for illustrating the functionality of the system and method in accordance with the present invention.

FIG. 5 shows a graphical plot of an operation throughput depending on a write/read ratio. At a write/read ratio of 0 only read operations are performed. With a write/read ratio of 1 only write operations are performed. The performance curve depicted is specific for an exemplary index node implementation, caching scheme and depends also on the employed operating system as well as the hardware network infrastructure.

Figure 6:
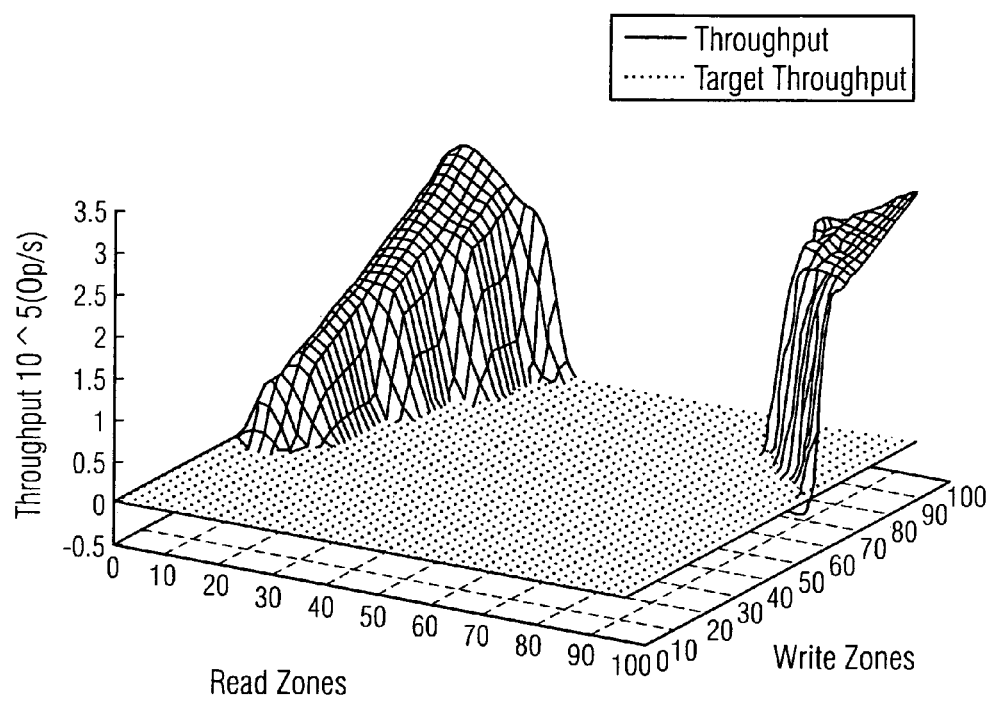

Plotting all configurations for different read-and-write zones leads to the diagram shown in FIG. 6, which shows the throughput of the system versus the partition cloud configuration. As evident from FIG. 6, the throughput of the system depends on the configuration of the write and read zones. This configuration is adapted by the master index node MIN in response to the measured read-and-write throughputs and the measured loads of the index nodes IN. In an embodiment, the re-configuration is performed regularly, e.g., every hour. In an alternative embodiment, the re-configuration is triggered by an event, e.g., when a required minimum read-and-write throughput for an index node can not be provided. The master index node MIN allows for an autonomous organization of the index cloud. A monitoring module can determine a base for a characteristic function and the master index node MIN fits the curve and computes an optimal number of read-and-write zones. Thereby, the index load can be adapted to changing load patterns by adjusting the number of read and write zones. In an extreme case such as shown in FIG. 2a, a partitioned index cloud can degenerate to a fully replicated index cloud to achieve maximum read performance. In the other extreme case as shown in FIG. 2b, the write performance is maximized.

In response to a query, a node of the distributed system can contact the found data source or data generator node matching the query and possibly control a corresponding actuator. For example, a node N of an energy supplier searching for a specific metering device having a desired characteristic and located at a desired location can search such a device by sending or transmitting a query for corresponding metadata to an index node IN of the distributed system. After having found a matching node or device having the desired characteristic, the inquiring node N can contact the found node to control an actuator, such as a switching device. For example, an inquiring node N of an energy supplier can search for all consumers having consumed a high level of energy within the last hour to contact the respective nodes indicating the excess energy consumption or even sending a control signal to switch off the respective consumer nodes to protect the energy supply system against de-stabilization.

The index nodes IN provide the searchable index comprising metadata for locating and finding data stored in nodes of the distributed system. Index nodes IN can be formed in an embodiment by servers or computers or micro processors in an embedded system. With the distributed system in accordance with the contemplated embodiments of the present invention, a re-configuration can be performed in one embodiment dynamically in real time. In one embodiment, the nodes N are formed by im-mobile nodes connected to a wired network. In another embodiment, the nodes N are formed by mobile devices. These mobile nodes N can communicate with the network by a wireless data link.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention. Moreover, it should be recognized that methods and structures shown and/or described in connection with any disclosed form or embodiment of the invention may be incorporated in any other disclosed or described or suggested form or embodiment as a general matter of design choice.

What is claimed is:

1. A distributed system comprising a plurality of nodes, said system comprising:
    a set of index nodes configured to provide a searchable index comprising metadata for locating data in the system, the set of index nodes being divided into read zones comprising a group of index nodes containing a complete searchable index, and the read zones being subdivided in write zones each comprising at least one index node containing a partition of the complete searchable index; and
    a master index node having a processor and memory, the master index node being configured to maintain an index structure of the complete searchable index by collecting from each index node measures of a current read and write throughput of a respective index node of the set of index nodes dependent on a current load of the respective index node;
    wherein the master index node re-configures the read zones and corresponding write zones in response to measured read and write throughputs and measured loads of the set of index nodes.

2. The distributed system according to claim 1, wherein the master index node is configured to calculate an optimum number of read and write zones and to re-configure the read zones and the corresponding write zones automatically such that a predetermined target read and write throughput is achieved.

3. The distributed system according to claim 1, wherein the master index node is configured to maintain an index structure of said searchable index; a plurality of index nodes are configured to provide the searchable index which indicates storage locations of metadata of the plurality of nodes; and the plurality of nodes is formed by data generator nodes and data consumer nodes.

4. The distributed system according to claim 2, wherein the master index node is configured to maintain an index structure of said searchable index; a plurality of index nodes are configured to provide the searchable index which indicates storage locations of metadata of the plurality of nodes; and the plurality of nodes is formed by data generator nodes and data consumer nodes.

5. The distributed system according to claim 3, wherein each of the plurality of nodes include at least one of data sources for generating data and data sinks for consuming data.

6. The distributed system according to claim 5, wherein the data sources comprise at least one of sensors, counters and meters.

7. The distributed system according to claim 6, wherein each of the plurality of nodes are connected to each other by one of a wired and wireless network and exchange data and share resources to store data.

8. The distributed system according to claim 1, wherein the searchable index is provided for at least one of finding data sources and particular kinds of data in response to a query sent by a node of the plurality of nodes to an index node of the set of index nodes.

9. The distributed system according to claim 1, wherein all nodes of the network comprise node identifiers, and wherein all index nodes comprise node identifiers within a predetermined index identifier range.

10. The distributed system according to claim 9, wherein an index node table indicating a current read and write throughput and a current load of each index node of the set of index nodes is stored in the memory.

11. The distributed system according to claim 10, wherein an index node attribute indicates whether the respective index node of the set of index nodes is one of a read zone master index node assigned to a read zone, a write zone master index node assigned to a write zone, a read-and-write zone master index node assigned to a read-and-write zone and an index node unassigned to a zone.

12. The distributed system according to claim 1, wherein the measured load of a node comprises a current ratio between write operations and read operations performed by the respective node.

13. The distributed system according to claim 12, wherein the distributed system is an energy supply system comprising a plurality of metering devices as nodes for generating energy consumption data and energy supply data.

14. The distributed system according to claim 13, wherein the nodes are linked one of directly and indirectly by a data network to at least one index node of the set of index nodes providing said searchable index for finding at least one of data sources and particular kinds of data in the energy supply system.

15. The distributed system according to claim 14, wherein the metering devices each comprise metadata describing a characteristic of a respective metering device.

16. A method for performing a reconfiguration of a distributed system comprising a plurality of nodes, the method comprising:
  providing a searchable index comprising metadata for locating data stored in the distributed system by a set of index nodes divided into read zones containing a complete searchable index, the read zones being subdivided into write zones comprising at least one index node containing a partition of the complete searchable index;
  collecting, by a master index node having a processor and memory from each index node of the set of index nodes, measures of a current read-and-write throughput of a respective index node dependent on a current load of the respective index node; and
  re-configuring, by the master index node, the read zones and the corresponding write zones in response to measured read and write throughputs and measured loads of the index nodes.

* * * * *